Patented Oct. 30, 1945

2,387,865

UNITED STATES PATENT OFFICE 2,387,865

FIRE-RETARDING COATING

Arthur Van Kleeck, Madison, Wis.

No Drawing. Application July 21, 1943
Serial No. 495,572

1 Claim. (Cl. 106—15)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

This is a continuation in part of my copending application for patent, Serial No. 452,765, filed July 29, 1942.

I hereby dedicate the invention herein described to the free use of the people in the territory of the United States to take effect on the granting of a patent to me.

This invention relates to coating preparations for application to the surface of a combustible material such as wood to increase its fire resistance.

Aqueous solutions of fire-retarding chemicals are known, one or two coats of which will afford some protection. However, their viscosities are substantially no greater than that of water, and their solubility is limited. Many coats are, therefore, necessary to give protection against fires of a moderate or higher degree of severity. For example, the maximum concentrations of either of two of the best fire-retardants, monoammonium phosphate or diammonium phosphate, at 70° F., are 27 and 41 grams per 100 grams of solution, respectively. These, when applied by brush to soft woods, give coatings of approximately 1.5 and 3.0 grams, respectively, of the dry chemical per square foot of surface. Laboratory tests have shown that approximately 20 grams of ammonium phosphate per square foot are necessary for protection against fires of moderate severity. Therefore, a large number of coats of the solution are necessary for good protection, and use of the solution is not practical.

An object of this invention is to provide a fire-retarding coating preparation of such nature that good protection is obtained by application of a few coats, and which is of low cost, and may be prepared from readily obtainable constituents. In particular, an object is to provide an aqueous solution of fire-retarding chemicals of such high viscosity and high content of fire-retarding chemical that enough fire-retarding chemical can be applied in one or two coats to substantially check flame spread. A further object is to provide a new fire-retarding coating preparation that consists essentially of active fire-retarding ingredients, with a minimum of combustible ingredients.

I have discovered that by using a suitable thickening agent in the fire-retarding preparation, it is possible to apply 60 grams or more of the dry material per square foot in one coat. Soluble alkali alginates, such as sodium and ammonium alginates, are examples of satisfactory thickening agents for this purpose. These have the property of producing very thick gels with as little as 2 per cent by weight of the alginate dissolved in water. These gels do not act chemically with fire-retarding chemicals containing ammonium, alkali metal or magnesium ions, and therefore they may be used with these. An exception is borax (sodium tetraborate) which reacts with sodium and ammonium alginate solutions to cause them to set to a rubbery gel. Borax may be used as a constituent of a fire-retardant alginate preparation, however, if sufficient boric acid is mixed with it to prevent setting. By means of these alginates, the viscosity of the preparation is so increased that it is possible to add much more fire-retarding chemical than necessary to saturate the solution, and a thicker coat of the preparation may be applied to the surface.

I have also discovered that including in the preparation an amount of pulverized fire-retarding chemical in excess of that required to saturate the aqueous solution prevents formation of large crystals in the coating. This insures a uniform coating of small crystals.

I have further discovered that other materials, such as china clay and bentonite, may be introduced to improve brushing qualities, to stabilize the solution against settling, and to further thicken it.

Other materials such as wetting agents, decay and mold preventatives, corrosion preventatives, and coloring agents may also be added.

The relative proportioning of ingredients may be varied, and a wide variety of characteristics may be obtained by changing the proportions. The following examples of highly satisfactory proportions are given by way of illustration.

*Example 1*

| | Parts by weight |
|---|---|
| Monoammonium phosphate | 60 |
| 2 percent aqueous alginate gel | 40 |

The alginate gel is prepared by stirring 2 parts by weight of sodium alginate into 98 parts of hot water. The 60 parts of monoammonium phosphate are ground in a pebble mill with the 40 parts of gel until the monoammonium phosphate is reduced to a fine state of subdivision; or the monoammonium phosphate may be added in pre-powdered form.

Example 2

| | Parts by weight |
|---|---|
| Monoammonium phosphate | 48 |
| China clay | 12 |
| 2 percent aqueous alginate gel | 40 |

The gel is prepared in the same manner as in Example 1. The proper proportions of monoammonium phosphate and china clay are ground together, and this mixture is milled or mixed into the gel.

Example 3

| | Parts by weight |
|---|---|
| Borax ($Na_2B_4O_7.10H_2O$) | 30 |
| Boric acid | 30 |
| 2 percent aqueous alginate gel | 40 |

The gel is prepared in the same manner as in Example 1. The proper proportions of borax and boric acid are ground in a pebble mill with the 40 parts of gel until the particles of solid are reduced to a fine state of subdivision.

The high viscosity of these preparations maintains the excess of finely ground fire-retarding chemicals in suspension during application of the coating. Although the chemicals may settle upon standing, they remain in a finely divided state, and are readily returned to suspension by stirring.

Both of the first two above examples employ monoammonium phosphate as the fire-retarding chemical, and the third example employs borax. These are the most effective from the standpoint of fire-retarding characteristics, resistance to dampness, and production of viscosity. Other chemicals may be used, however, such as ammonium sulfate, diammonium phosphate and ammonium sulfamate. All that is necessary is that a chemical be selected that does not react with the alginate.

The preparations of this invention are especially valuable for interior uses, such as for coating walls and ceilings of attics, storage sheds, warehouses, barracks, hangars and any other buildings of wood construction. The water solubility of the principal ingredient makes them unsatisfactory for exterior exposures. Their fire-retarding effectiveness is excellent, and insofar as at present known, is permanent under dry conditions. The preparations are simple to compound, either by manufacturers or home owners, and are simple to use.

Having thus described my invention, what I claim is:

A fire-retarding composition comprising an aqueous solution of an alkali alginate of about 2 percent by weight concentration having finely divided borax and boric acid incorporated therein in the proportion of about 40 parts of the gel, 30 parts of the borax and 30 parts of the boric acid, said composition being such that one application of the composition on a wood surface upon drying will yield a coating weighing at least 10 grams per square foot and having at least 90 percent of active fire-retarding chemicals.

ARTHUR VAN KLEECK.